United States Patent
Ma et al.

(10) Patent No.: US 12,549,770 B2
(45) Date of Patent: Feb. 10, 2026

(54) AUTOMATIC GENERATION OF VIDEO CONTENT IN RESPONSE TO NETWORK INTERRUPTION

(71) Applicant: QUALCOMM Incorporated, San Diego, CA (US)

(72) Inventors: Liangping Ma, San Diego, CA (US); Thomas Stockhammer, Bergen (DE); Alberto Rico Alvarino, San Diego, CA (US); Nikolai Konrad Leung, San Francisco, CA (US); Imed Bouazizi, Frisco, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 507 days.

(21) Appl. No.: 17/933,791

(22) Filed: Sep. 20, 2022

(65) Prior Publication Data

US 2024/0098307 A1 Mar. 21, 2024

(51) Int. Cl.
*H04N 19/68* (2014.01)
*H04L 67/141* (2022.01)

(52) U.S. Cl.
CPC ........... *H04N 19/68* (2014.11); *H04L 67/141* (2013.01)

(58) Field of Classification Search
CPC .............. H04L 67/141; H04N 21/2404; H04N 21/6332; H04N 21/6437; H04N 21/816; H04N 21/63
See application file for complete search history.

(56) References Cited

U.S. PATENT DOCUMENTS

| | | | |
|---|---|---|---|
| 2002/0042830 A1* | 4/2002 | Bose | H04L 9/40 709/204 |
| 2008/0172315 A1* | 7/2008 | Farouki | G06Q 40/00 705/1.1 |
| 2013/0194436 A1 | 8/2013 | Unice | |
| 2014/0032987 A1 | 1/2014 | Nagaraj et al. | |
| 2015/0188972 A1 | 7/2015 | Matthews et al. | |
| 2019/0132618 A1* | 5/2019 | Reck | H04N 21/43074 |
| 2019/0349630 A1* | 11/2019 | Stockhammer | H04N 21/8456 |
| 2020/0202872 A1* | 6/2020 | Jensen | G10L 19/167 |
| 2020/0389515 A1* | 12/2020 | Hande | H04L 47/746 |
| 2021/0235313 A1* | 7/2021 | Devadoss | H04L 49/555 |
| 2022/0038789 A1* | 2/2022 | Giladi | H04L 65/65 |
| 2022/0272134 A1* | 8/2022 | Jain | H04L 65/4015 |

(Continued)

OTHER PUBLICATIONS

Fielding R., et al., "Hypertext Transfer Protocol—HTTP/1.1," IETF RFC 2616, Revision 1.9, Jun. 1999, pp. 1-176.

(Continued)

*Primary Examiner* — Michael A Keller
*Assistant Examiner* — Thao D Duong
(74) *Attorney, Agent, or Firm* — Shumaker & Sieffert, P.A.

(57) ABSTRACT

An example device for presenting media data includes a memory configured to store media data; and one or more processors implemented in circuitry and configured to: receive a first set of media data of a media bitstream; in response to determining that a second set of media data of the media bitstream following the first set of media data will not be received within a period of time, predictively generate replacement media data for the second set of media data using at least a subset of the first set of media data; and present the first set of media data and the replacement media data.

40 Claims, 10 Drawing Sheets

(56) References Cited

U.S. PATENT DOCUMENTS

2022/0417467 A1* 12/2022 Roeder ............ H04N 21/23805
2023/0298750 A1* 9/2023 Patel ...................... G16H 40/63
                                                        340/540
2024/0089750 A1* 3/2024 Chin ..................... H04W 24/02

OTHER PUBLICATIONS

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Paila T., et al., "Flute—File Delivery Over Unidirectional Transport", Flute—File Delivery Over Unidirectional Transport, rfc6726.txt, Internet Engineering Task Force (IETF), Standard Track, Internet Society (ISOC) 4, Rue Des Falaises CH—1205 Geneva, Switzerland, Nov. 6, 2012 (Nov. 6, 2012), XP015086468, pp. 1-46.
International Search Report and Written Opinion—PCT/US2023/032704—ISA/EPO—Dec. 20, 2023.

* cited by examiner

AUTOMATIC GENERATION OF VIDEO CONTENT IN RESPONSE TO NETWORK INTERRUPTION

TECHNICAL FIELD

This disclosure relates to transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for automatically generating media content (e.g., image content, video content, and/or audio content) in response to determining that requested media content will not be received within a certain period of time, e.g., a period of time for usability. For example, media data may be streamed from a source device to a destination device via a computer-based network. A network interruption (e.g., an interruption in connectivity between the source device and the destination device) may prevent a portion of the media data from being sent from the source device to the destination device in time to allow for seamless playback of subsequent media data. The network interruption may be caused by a network error such as packet loss and/or during a handover between cells of a radio access network (RAN).

In response to such a network interruption, the destination device may generate replacement media data for the media data that will not be delivered to the destination device. For example, the destination device may apply artificial intelligence and/or machine learning processes to generate the replacement media data. The media data may be part of a live media session between two user devices, such as a multimedia call (e.g., a video teleconference or an extended reality (XR) session, such as an augmented reality (AR), mixed reality (MR), or virtual reality (VR) session). In this manner, the destination device may avoid requesting retransmission of the media data that will not be delivered (which may avoid increasing latency for the media communication session) while also improving user experience through avoiding a black screen or duplicated/copied frames.

In one example, a method of presenting media data includes receiving a first set of media data of a media bitstream; in response to determining that a second set of media data of the media bitstream following the first set of media data will not be received within a period of time, predictively generating replacement media data for the second set of media data using the first set of media data; and presenting the first set of media data and the replacement media data.

In another example, a device for presenting media data includes a memory configured to store media data; and one or more processors implemented in circuitry and configured to: receive a first set of media data of a media bitstream; in response to determining that a second set of media data of the media bitstream following the first set of media data will not be received within a period of time, predictively generate replacement media data for the second set of media data using the first set of media data; and present the first set of media data and the replacement media data.

In another example, a device for presenting media data includes means for receiving a first set of media data of a media bitstream; means for predictively generating replacement media data, in response to determining that a second set of media data of the media bitstream following the first set of media data will not be received within a period of time, for the second set of media data using the first set of media data; and means for presenting the first set of media data and the replacement media data.

In another example, a computer-readable storage medium has stored thereon instructions that, when executed, cause one or more processors to receive a first set of media data of a media bitstream; in response to determining that a second set of media data of the media bitstream following the first set of media data will not be received within a period of time, predictively generate replacement media data for the second set of media data using the first set of media data; and present the first set of media data and the replacement media data.

The details of one or more examples are set forth in the accompanying drawings and the description below. Other features, objects, and advantages will be apparent from the description and drawings, and from the claims.

DETAILED DESCRIPTION

Figure 1:
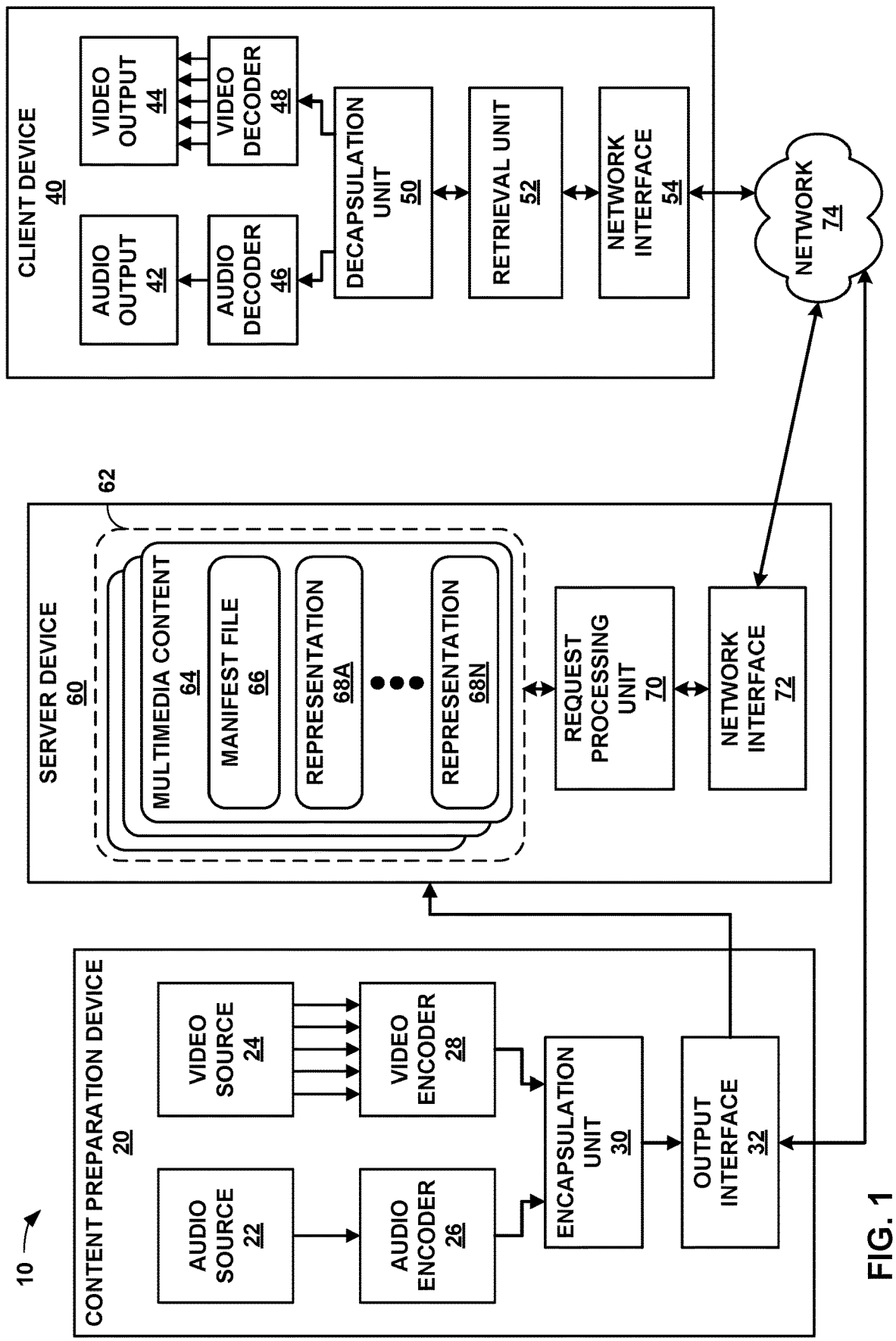
FIG. 1 is a block diagram illustrating an example system that implements techniques for streaming media data over a network.

In general, this disclosure describes techniques for generating replacement media data for a media streaming session between two or more media devices. For example, two user equipment (UE) devices may be engaged in a multimedia teleconference or multimedia session, such as a video teleconference or an extended reality (XR) session, e.g., an augmented reality (AR), mixed reality (MR), or virtual reality (VR) session. The two UE devices may exchange media data via a computer-based network, e.g., a cellular network, local area network, or short-range data transfer network.

For example, one or both UE devices may be carried by a user who is moving between cells of a radio access network (RAN). When moving between cells, a UE device may perform a handover procedure from a base station of one cell to a base station of a different cell.

During such a handover, a UE device and a base station may exchange radio resource control (RRC) messages and follow a random access channel (RACH) procedure. The RACH procedure may take approximately 50 ms or more to perform. When performing a handover from one cell to another, data transmission as part of an ongoing communication session, such as a media teleconference, is interrupted, such that multiple video frames (or other media data, such as XR data or image data) will not meet delivery deadlines, which can significantly affect a user's experience.

Rather than simply presenting a black screen or copied (e.g., duplicated) video frames in response to such an interruption, a UE device according to the techniques of this disclosure may detect this network interruption and, in response, generate replacement media data for the media data that will not be received within a period of time due to the interruption. The media data that will not be received may be either media data that will be entirely lost, corrupted, and/or delayed to such an extent that the delayed media data arrives later than an intended presentation time at the UE device. The UE device may generate the replacement media data using an artificial intelligence (AI) and/or machine learning (ML) process. The UE device may provide recently received media data to the AI/ML process, and the AI/ML process may predictively generate replacement media data for the media data that will not be received within a period of time due to the network interruption. The period of time may be a time during which the media data would otherwise be usable (e.g., decodable and presentable).

Certain applications installed on the UE that perform media communication sessions (e.g., Apple FaceTime, Microsoft Teams, Zoom Cloud Meetings, Google Meet, Facebook Messenger, or the like) may be configured to allow enabling or disabling of the generation of replacement media data according to the techniques of this disclosure. For example, the application may be configured to enable or disable replacement media data generation.

A UE device may request user consent to generate the replacement media data, e.g., as a setting of a media conferencing application prior to initiating (or establishing) a media session, at the time the media session is initiated (or established), and/or in response to detecting the network interruption. In some cases, a user may not want to have replacement media data, e.g., if the media session pertains to a newsworthy event such as a live sporting event, political event, or other such event. Likewise, a UE device may be configured not to generate replacement data for certain types of media data, such as pre-recorded movies or television shows, to avoid intellectual property (e.g., copyright) rights violations and/or certain types of media sessions such as personal video teleconferences (vs. work-related sessions). In other words, in some implementations, whether the generation of replacement media data is allowed (or enabled) at the UE device may be further (or alternatively) based on one or more characteristics of the media data, a type of the media data, and/or a type of the media session.

Through application of the techniques of this disclosure, a UE device may generate replacement media data in response to determining that certain media data will not be received within a period of time, e.g., a period of time during which the media data is usable (decodable and presentable by a specified output time). By performing these techniques, the UE device may avoid requesting retransmission of the media data that will not be received, which would introduce latency into the media streaming session and consume additional network resources, e.g., bandwidth. Likewise, the UE device may also present the replacement media data, which is an improvement to the user experience over presenting copied (e.g., duplicated) frames or a blank screen. In this manner, the techniques of this disclosure provide technical improvements to the field of media transmission, generation, and presentation, as well as to the operation of the UE device and other network devices involved in media transmission and presentation.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some cases, connection to devices via network 74 or other connections may encompass wireless wide area network (WWAN), wireless local area network (WLAN), Bluetooth, or other long or short range wireless connections. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC, High Efficiency Video Coding (HEVC), Versatile Video Coding (VVC), Enhanced Video Coding (EVC), and AOMedia Video 1 (AV1), define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In some examples, a single user equipment (UE) device may include each of the components of content preparation device 20, server device 60, and client device 40. The UE device may engage in a media telecommunication session with another UE device that also includes the components of content preparation device 20, server device 60, and client device 40, or similar components. In this manner, each UE device may both send and receive media data (e.g., video, audio, and/or image data) as part of the media telecommunication session. The techniques of this disclosure are generally described with respect to one of content preparation device 20, server device 60, or client device 40, although these techniques may also be performed by a UE device including the components of content preparation device 20, server device 60, and client device 40, or similar components.

Client device 40 may, for example, represent any of a cellular telephone, a smartphone, a tablet, a laptop, a head mounted display (HMD), or the like. Server device 60 may represent a network server, a second UE device such as a second cellular telephone, smartphone, tablet, laptop, or the like. In some examples, server device 60 may be configured as a UE and client device 40 may be configured as a companion device to server device 60, such that network 74 may represent a relatively short distance communicative coupling, such as a wireless local area network (WLAN), WiFi, or Bluetooth wireless link between server device 60 and client device 40.

In some examples, server device 60 (e.g., network interface 72) or content preparation device 20 may be configured to detect a network interruption within network 74. For example, a UE device including the components of content preparation device 20 and/or server device 60 and that is sending media data to client device 40 may experience a network handover from one base station to another base station. In response, video encoder 28 forms data (e.g., non-video content data referred to as metadata or non-VCL data) to be sent to client device 40 indicative of the network interruption. For example, video encoder 28 may form non-VCL data (e.g., a supplemental enhancement information (SEI) message) indicating that client device 40 should enter an autopilot mode during which client device 40 is to generate replacement data. Video encoder 28, or another component of content preparation device 20 and/or server device 60, may form the data (e.g., the SEI message) to indicate a start time in which to enter (e.g., transition into) the autopilot mode and an end time at which to end (e.g., transition out of) the autopilot mode. In some examples, the data may further include messaging that causes the client device 40 to issue a prompt to request user consent to enter the autopilot mode. In other examples, rather than sending an SEI message, network interface 72 may form a message according to a communication protocol, such as a real-time transport protocol (RTP), including the start and end times for the autopilot mode.

In some examples, an application of client device 40 may include configuration data indicating whether autopilot mode is enabled. Assuming that autopilot mode is enabled per this configuration data, in response to receiving the data indicating to enter the autopilot mode, video decoder 48, or another component of client device 40, may prompt a user thereof for consent to use the autopilot mode. In some cases, the configuration data enabling autopilot mode may be provided by the user such that only the pre-authorization of autopilot mode being enabled is used, whereas in other examples, when autopilot mode is enabled by the configuration data, the user may still receive a prompt to provide consent as to whether to enter autopilot mode. If client device 40 receives affirmative consent from the user to use the autopilot mode or determines that the user has previously authorized consent to use the autopilot mode, video decoder 48 (or another unit of client device 40) may generate replacement video content (e.g., using AI/ML), starting at the specified start time and stopping at the specified end time, or at least until received media data has been timely decoded. In some examples, replacement media data may continuously be generated by the video decoder 48 during the media telecommunication session, but only presented during the autopilot mode.

As noted above, in some examples, the media telecommunication session may include, in addition or in the alternative to the video data, XR/AR/VR/MR data. The techniques of this disclosure may also be used to generate replacement XR/AR/VR/MR data, in addition or in the alternative to the video data. The XR content (e.g., AR, VR, or MR content) may be, for example, computer generated 2D or 3D graphics data to be presented to a user.

In another example, client device 40 may be configured to detect a network interruption within network 74. For example, a UE device including the components of client device 40 for receiving and presenting media data via network 74 may determine that the UE device is experiencing a network handover from one base station to another base station, or other network interruption. In response, video decoder 48 (or another element of client device 40) may prompt a user of client device 40 for consent to enter the autopilot mode (i.e., to generate replacement media data for media data that is determined will not be received during the network interruption). If client device 40 receives input from the user indicating affirmative consent to enter the autopilot mode and if autopilot mode is enabled, client device 40 may generate the replacement media data for the media data that is determined will not be received during the network interruption, e.g., using an AI/ML process.

In some examples, client device 40 may also send data indicating that the network interruption has occurred to content preparation device 20 and/or server device 60. The data may indicate a start time and an end time (e.g., an estimate of the end time) of a time period for the network interruption. In response, content preparation device 20 and/or server device 60 may stop transmitting media data during the indicated time period. In some examples, video encoder 28 may generate the next video frame to be sent to client device 40 as an intra-prediction encoded frame (I-frame) in response to the data from client device 40. In some examples, video encoder 28 may change the reference picture for a subsequent picture to an uninterrupted frame (e.g., a last uninterrupted uni-directional inter-predicted frame (P-frame)). In some examples, video encoder 28 may use the same AI/ML model as video decoder 48 to generate reference pictures, then use these generated reference pictures to perform inter-prediction of subsequent frames to be sent to client device 40 once the autopilot mode period has ended.

In some examples, after the network interruption has ended, video decoder 48 may blend received media data with generated replacement media data, such that a transition from the replacement media data to the received media data is less perceptible to a user of client device 40.

While FIG. 1 is explained with respect to DASH, the techniques of this disclosure may be used in conjunction with any of a variety of different media communication protocols. For example, the techniques of this disclosure may also (additionally or alternatively) be used in conjunction with Real-time Transport Protocol (RTP), Real-time Streaming Protocol (RTSP), Web Real-time Communications (WebRTC), Secure Reliable Transport (SRT), or the like, or any combination thereof.

Figure 2:
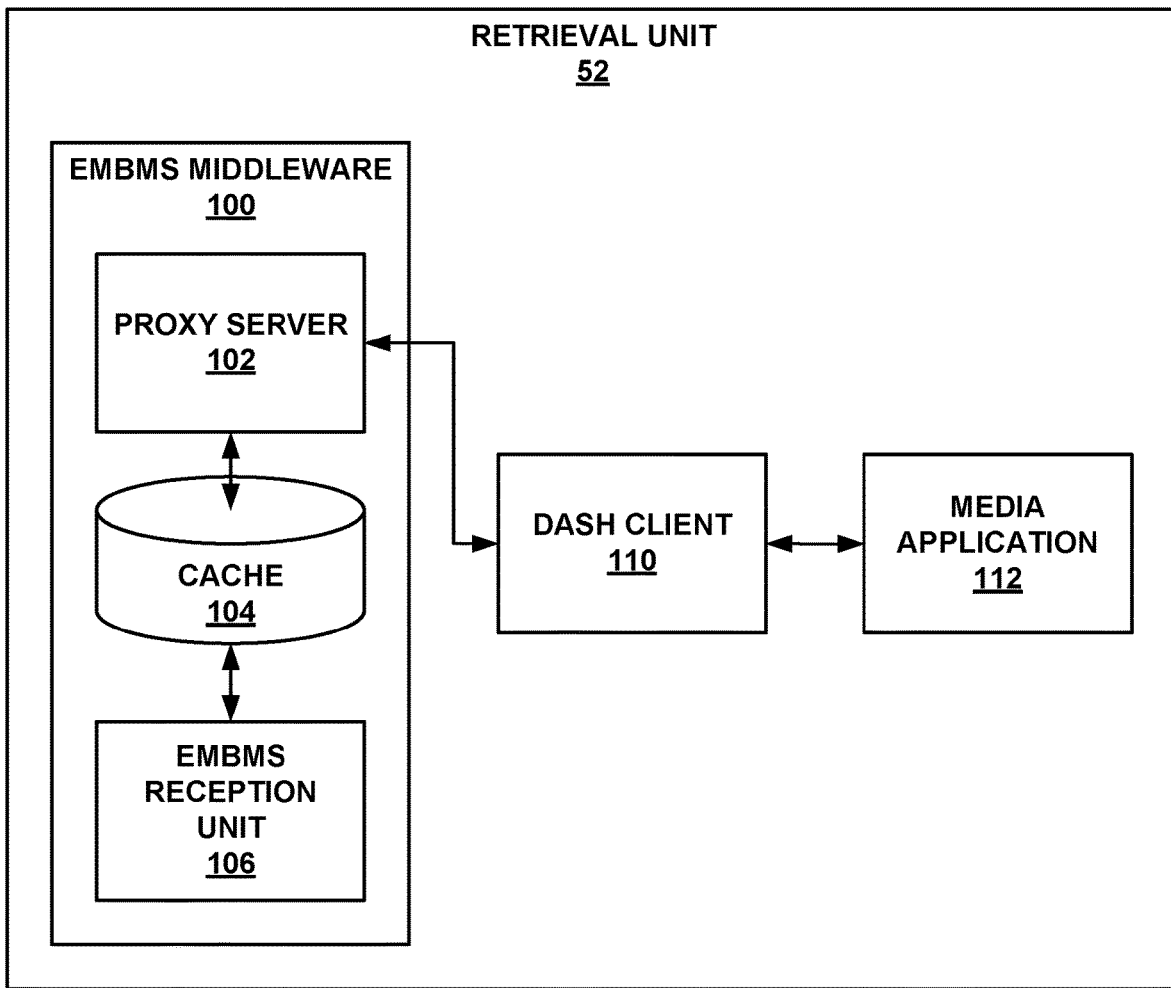
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
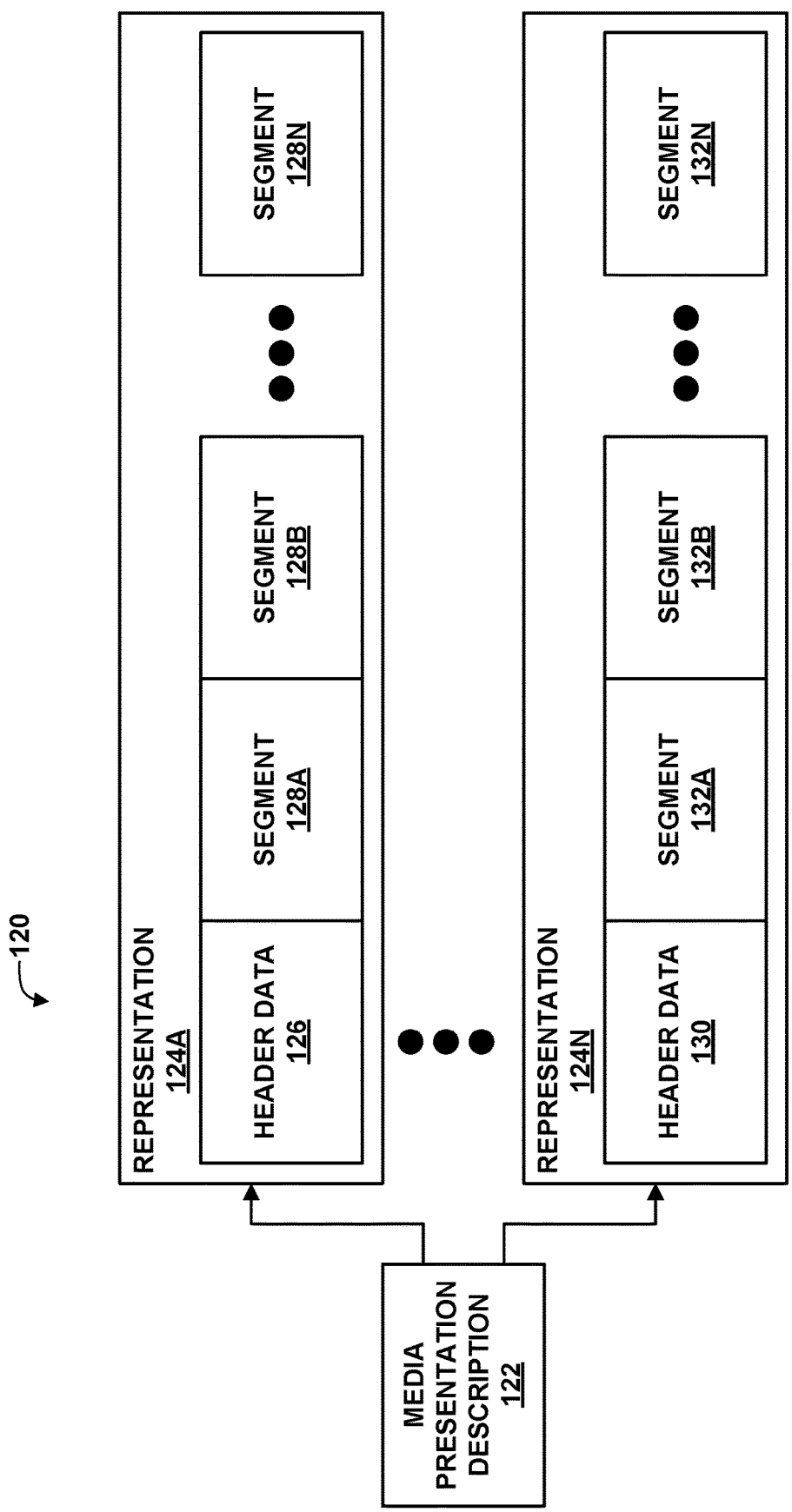
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
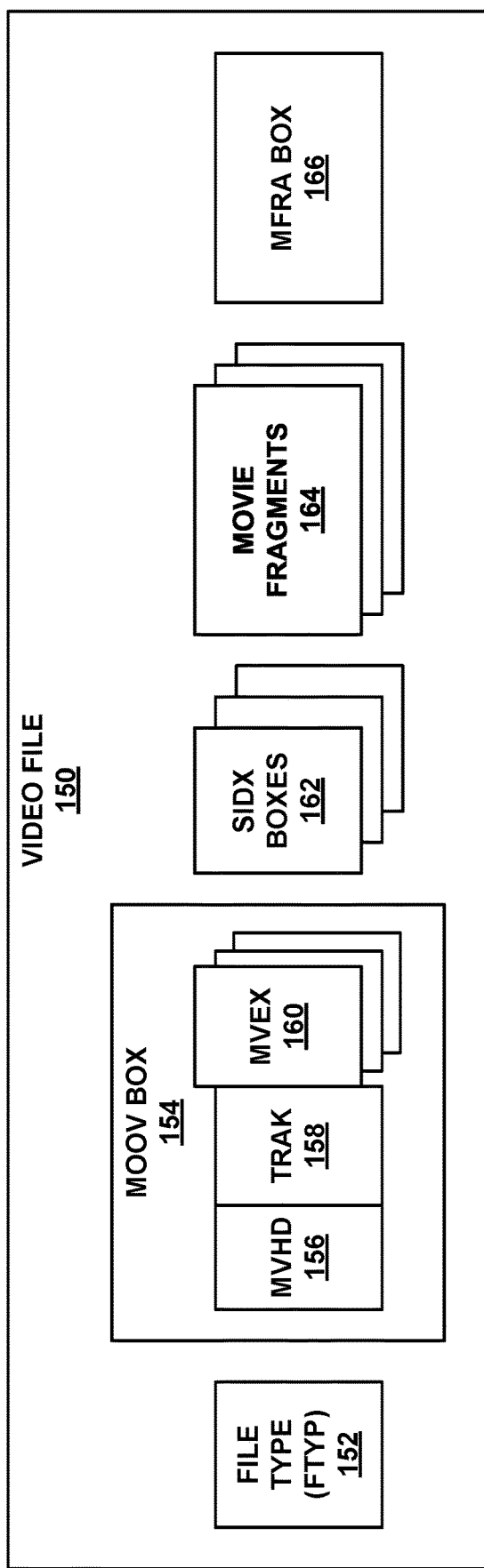
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub) segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
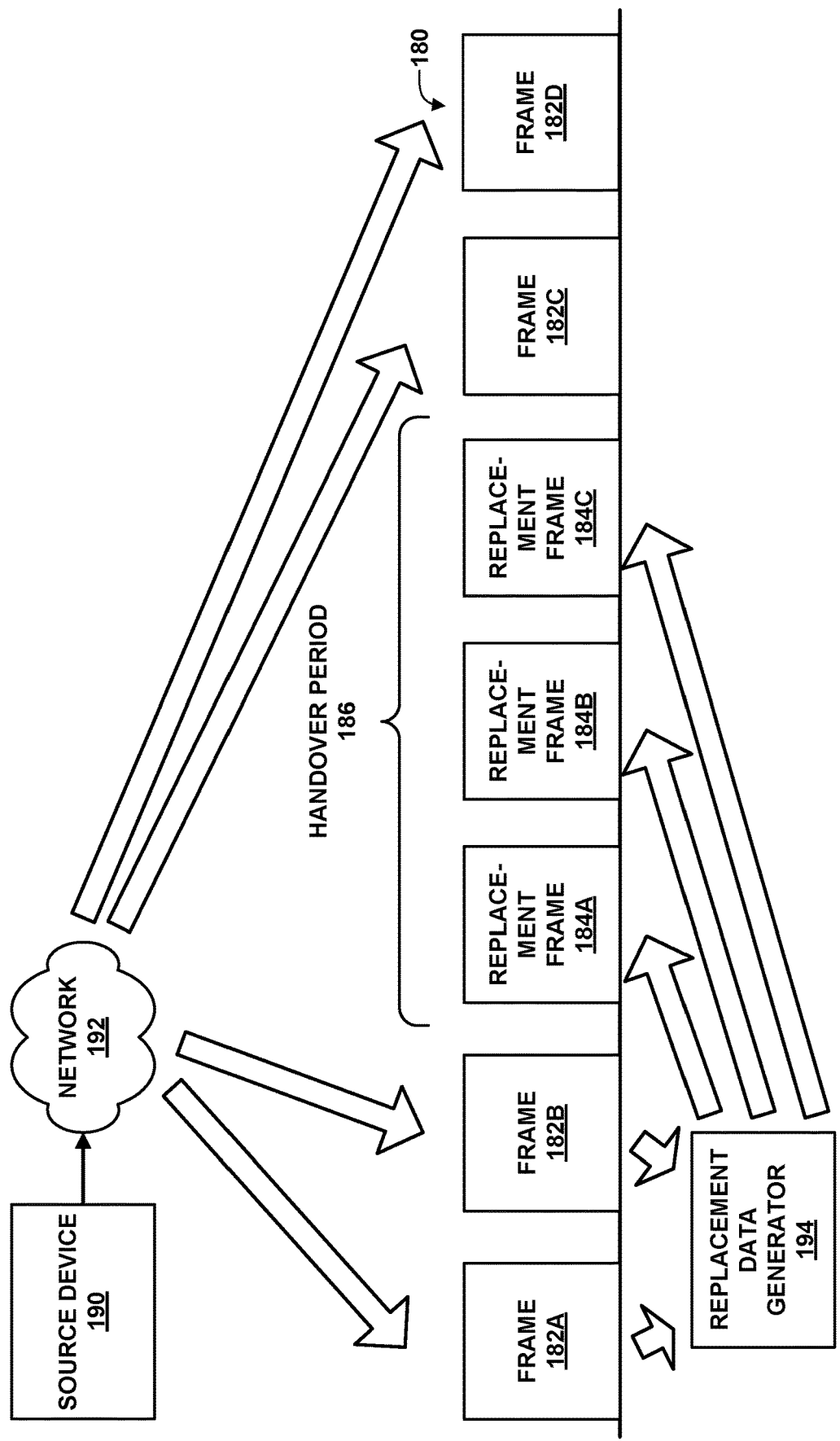
FIG. 5 is a conceptual diagram illustrating an example of generating replacement frames according to the techniques of this disclosure.

FIG. 5 is a conceptual diagram illustrating an example of generating replacement frames according to the techniques of this disclosure. In the example of FIG. 5, source device 190 sends media data 180 via network 192. Media data 180 includes frames 182A-182D (frames 182). In response to detection or an indication of handover period 186, replacement data generator 194 generates replacement frames 184A-184C (replacement frames 184).

Replacement data generator 194 may include one or more AI/ML models for generating replacement frames 184. In particular, replacement data generator 194 may receive at least one of frames 182A, 182B and apply at least one of frames 182A, 182B to the AI/ML models to generate one or more of replacement frames 184 using at least one of frames 182A, 182B.

In some examples, replacement data generator 194 may be included within client device 40 (FIG. 1). Thus, if client device 40 experiences a network interruption, client device 40 may generate replacement frames 184. In some examples, replacement data generator 194 may be included in an intermediate network device, such as a service device or service card of a network device, such as a router, within network 74 (FIG. 1) or network 192. Thus, if source device 190 experiences a network interruption, the intermediate network device may generate replacement frames 184 and encode the frames, then send the encoded replacement frames to client device 40.

As noted above, in some examples, client device 40 may send data to source device 190 indicating that client device 40 has experienced a network interruption. In response, in some examples, source device 190 may generate frame 182C as a forced I-frame. That is, if frame 182C was originally going to be encoded as a P-frame or a bi-directionally predicted frame (B-frame), source device 190 may instead encode frame 182C as an I-frame. In some examples, in response to the network interruption, source device 190 may encode frame 182C using only one or both of frames 182A, 182B as reference frames. That is, if one or more frames between frames 182B and 182C could otherwise have been used as a reference frame, source device 190 may avoid using these frames as reference frames, and instead, only use one or both of frames 182A, 182B as reference frames for inter-predicting frame 182C. In some examples, in response to the network interruption, source device 190 may also include its own replacement data generator that applies the same AI/ML models to frames 182A, 182B, and may also generate replacement frames 184 for use as reference frames, such that frames 182C, 182D can be predicted from replacement frames 184.

Figure 6:
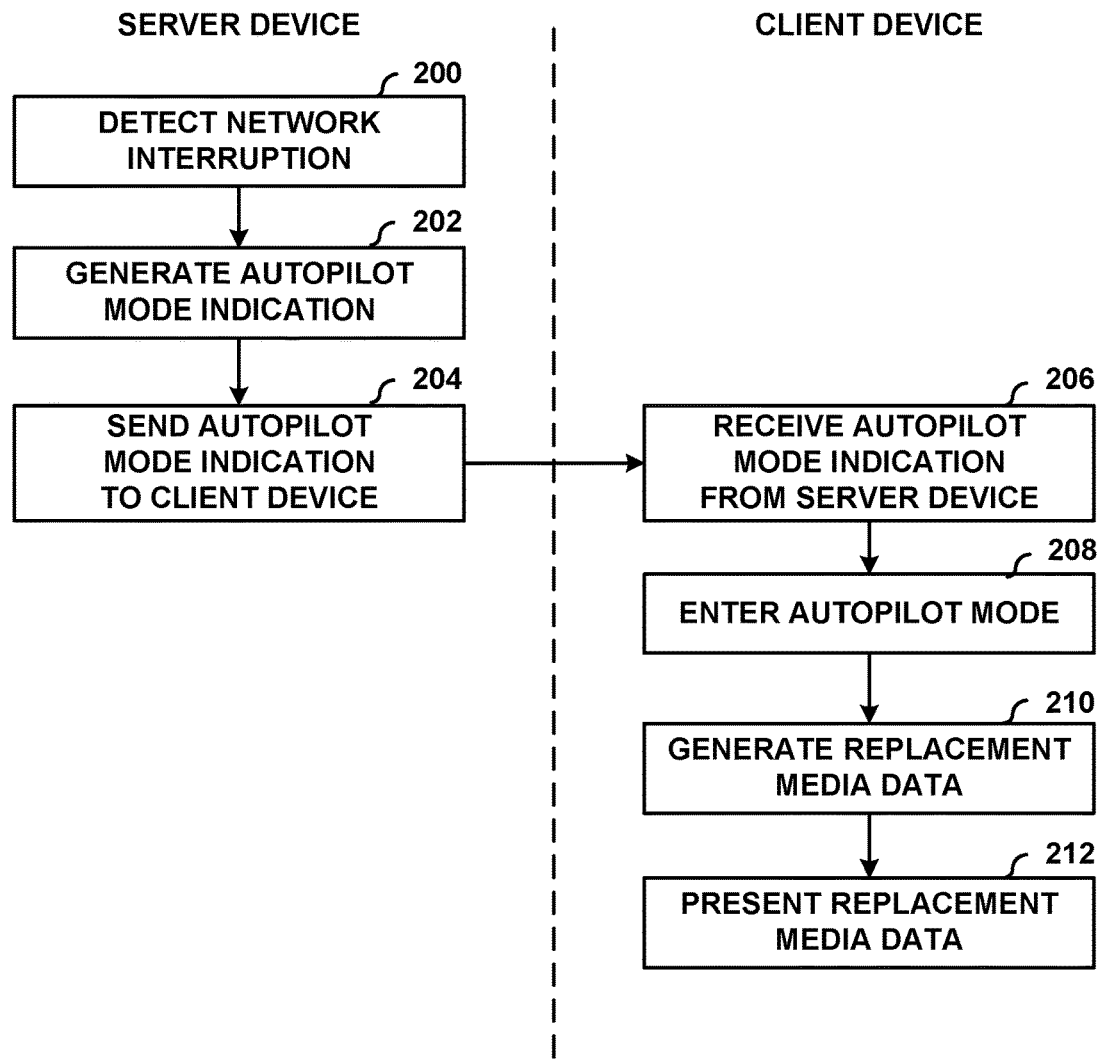
FIG. 6 is a flowchart illustrating an example method of generating and presenting replacement media data according to the techniques of this disclosure.

FIG. 6 is a flowchart illustrating an example method of generating and presenting replacement media data according to the techniques of this disclosure. In the example of FIG. 6, initially, a server device (such as server device 60 of FIG. 1) detects a network interruption, e.g., of network 74 (200). For example, server device 60 may determine that it is undergoing a handover, e.g., a switch between base stations of a radio access network. In response, server device 60 generates an autopilot mode indication message (202). The autopilot mode indication message may include data indicating a start time and an end time for the autopilot mode. In some examples, the autopilot mode indication message may further include data instructing a client device, such as client device 40 (FIG. 1) to prompt a user for consent to enter the autopilot mode. As noted above, the autopilot mode may generally cause client device 40 to generate replacement media data for media data that would otherwise be received between the indicated start time and the indicated end time.

Server device 60 may determine that the start time is the time of a start of a network handover, e.g., between base stations of a radio access network. Server device 60 may estimate the end time as being a typical time to complete the network handover, e.g., 50 ms. Thus, the start time may be T, the time at which the handover process begins, and the end time may be T+S, where S is the typical time to complete the network handover. If S is 50 ms, then, the start time may be T and the end time may be T+50 ms.

Server device 60 may then send the autopilot mode indication message to client device 40 (204). Client device 40 may receive the autopilot mode indication message from server device 60 (206). Although not shown in FIG. 6, it is assumed that server device 60 has been sending media data to client device 40 as part of a media streaming session. In this example, in response to receiving the autopilot mode indication message, client device 40 enters the autopilot mode (208), e.g., to generate replacement media data (e.g., video data) using previously received media data starting at time T as indicated in the autopilot mode indication message. Client device 40 may then generate replacement media data (210), e.g., using one or more AI/ML models and previously received media data. Client device 40 may present the replacement media data (212). Client device 40 may continue generating and presenting the replacement media data until the end time indicated in the autopilot mode indication message has been reached. After autopilot mode has ended, client device 40 may resume normal operation, i.e., receiving, decoding, and presenting media data of a bitstream from server device 60.

In this manner, the method of FIG. 6 represents an example of a method of presenting media data including receiving a first set of media data of a media bitstream; in response to determining that a second set of media data of the media bitstream following the first set of media data will not be received, predictively generating replacement media data for the second set of media data using the first set of media data; and presenting the first set of media data and the replacement media data.

Figure 7:
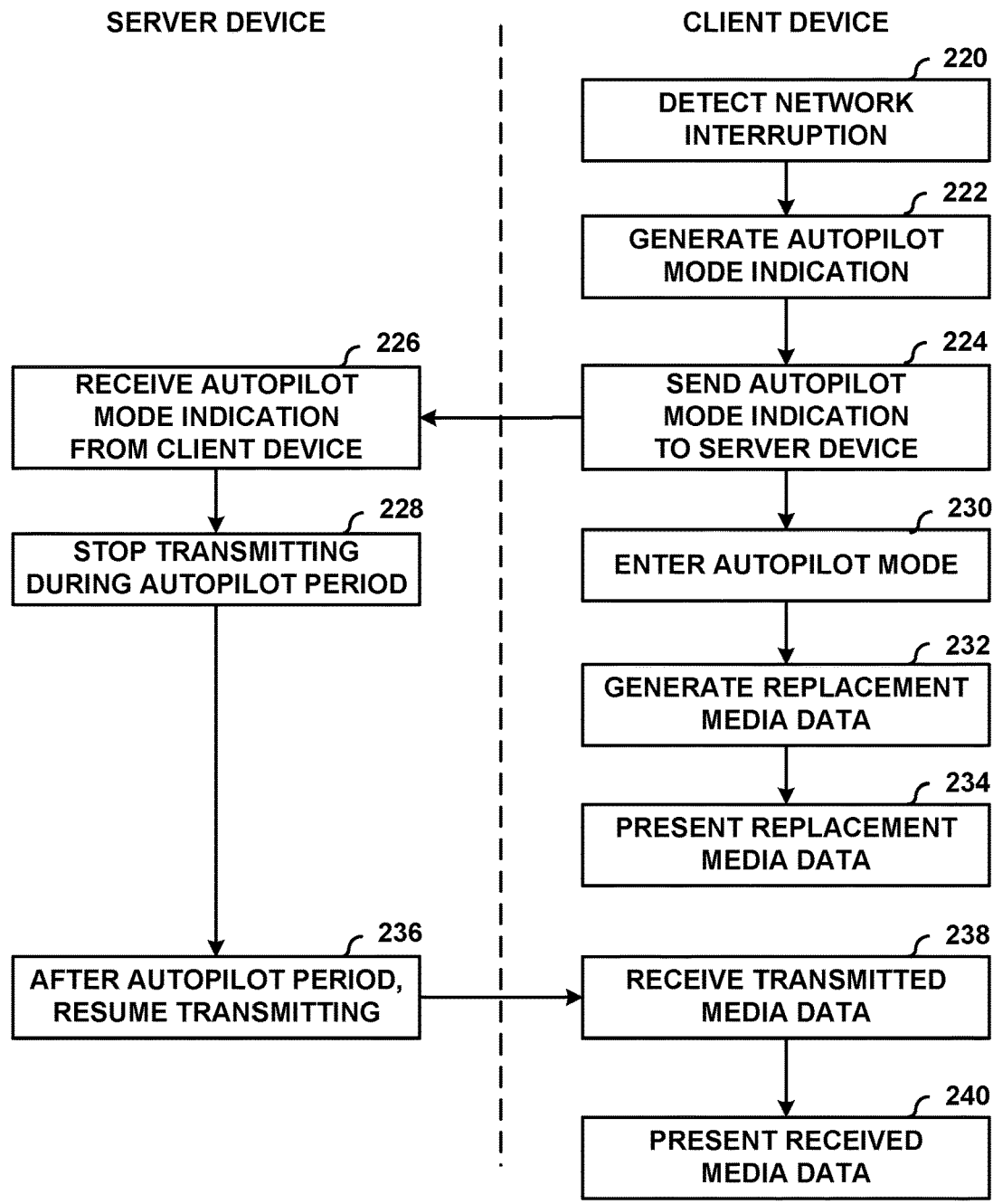
FIG. 7 is a flowchart illustrating another example method of generating and presenting replacement media data according to the techniques of this disclosure.

FIG. 7 is a flowchart illustrating another example method of generating and presenting replacement media data according to the techniques of this disclosure. In this example, client device 40 detects a network interruption (220). For example, client device 40 may determine that it is undergoing a handover from one base station to another. In response, client device 40 may generate an autopilot mode indication message (222) and send the autopilot mode indication message to server device 60 (224). Again, the autopilot mode indication message may include data indicating a start time and an end time of the autopilot mode. Thus, server device 60 may receive the autopilot mode indication message (226) and stop transmitting media data during the autopilot period (228), where the autopilot period corresponds to the time between the start and end times for the autopilot mode.

During this time, client device 40 may enter the autopilot mode (230). While in autopilot mode, client device 40 may generate replacement media data (232), e.g., using one or more AI/ML models and previously received media data from server device 60. Likewise, client device 40 may present the replacement media data (234). After the autopilot period ends, server device 60 may resume transmitting media data (236). Client device 40 may receive the transmitted media data (238) and present the received media data (238).

In this manner, the method of FIG. 7 represents an example of a method of presenting media data including receiving a first set of media data of a media bitstream; in response to determining that a second set of media data of the media bitstream following the first set of media data will not be received, predictively generating replacement media data for the second set of media data using the first set of media data; and presenting the first set of media data and the replacement media data.

Figure 8:
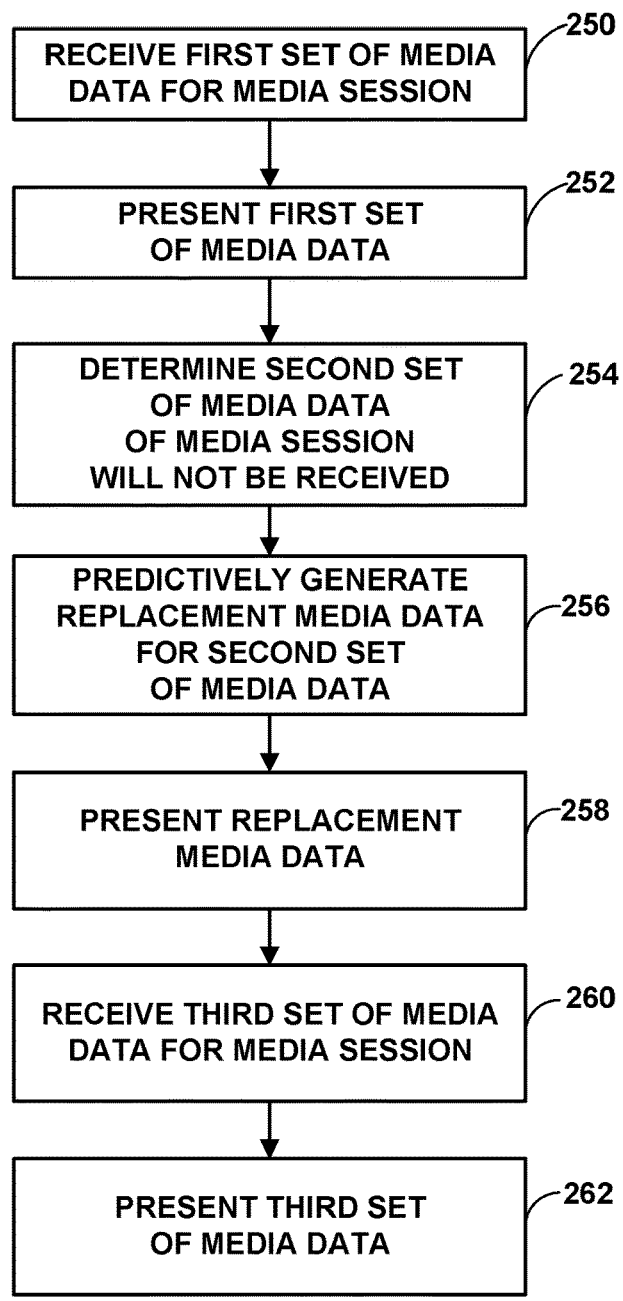
FIG. 8 is a flowchart illustrating an example method of generating and presenting media data according to the techniques of this disclosure.

FIG. 8 is a flowchart illustrating an example method of generating and presenting media data according to the techniques of this disclosure. Initially, client device 40 may receive a first set of media data for a media session from server device 60 (250). Client device 40 may communicate with server device 60 via separate channels, such as a signaling channel and a data communication channel. Client device 40 and server device 60 may exchange low bandwidth signaling messages via the signaling channel and higher bandwidth media data via the data communication channel. Client device 40 may decode and present the first set of media data (252).

Client device 40 may then determine that a second set of media data of the media session will not be received (254). For example, client device 40 may determine that it is undergoing a handoff from one base station to another. As another example, client device 40 may receive a message from server device 60 (e.g., via the signaling channel) indicating that server device 60 is undergoing a handoff from one base station to another. In some examples, client device 40 or server device 60 may determine that a loss of signal or reduction of signal strength is likely due to a location and/or direction of geographical movement of client device 40, server device 60, or both. For example, certain geographical regions may historically lead to loss of signal, such as if either of client device 40 or server device 60 is moving in a vehicle through a tunnel, through an area with low wireless coverage, in an area with high signal interference, or the like.

Client device 40 may then enter the autopilot mode and predictively generate replacement media data for the second set of media data (256). For example, client device 40 may apply one or more AI/ML models to at least a portion of the first set of media data to generate the replacement media data. Client device 40 may also present the replacement media data (258).

Subsequently, client device 40 may begin receiving a third set of media data for the media session from server device 60 (260). Thus, client device 40 may stop generating the replacement media data and instead present the received third set of media data (282).

In this manner, the method of FIG. 8 represents an example of a method of presenting media data including receiving a first set of media data of a media bitstream; in response to determining that a second set of media data of the media bitstream following the first set of media data will not be received, predictively generating replacement media data for the second set of media data using the first set of media data; and presenting the first set of media data and the replacement media data.

Figure 9:
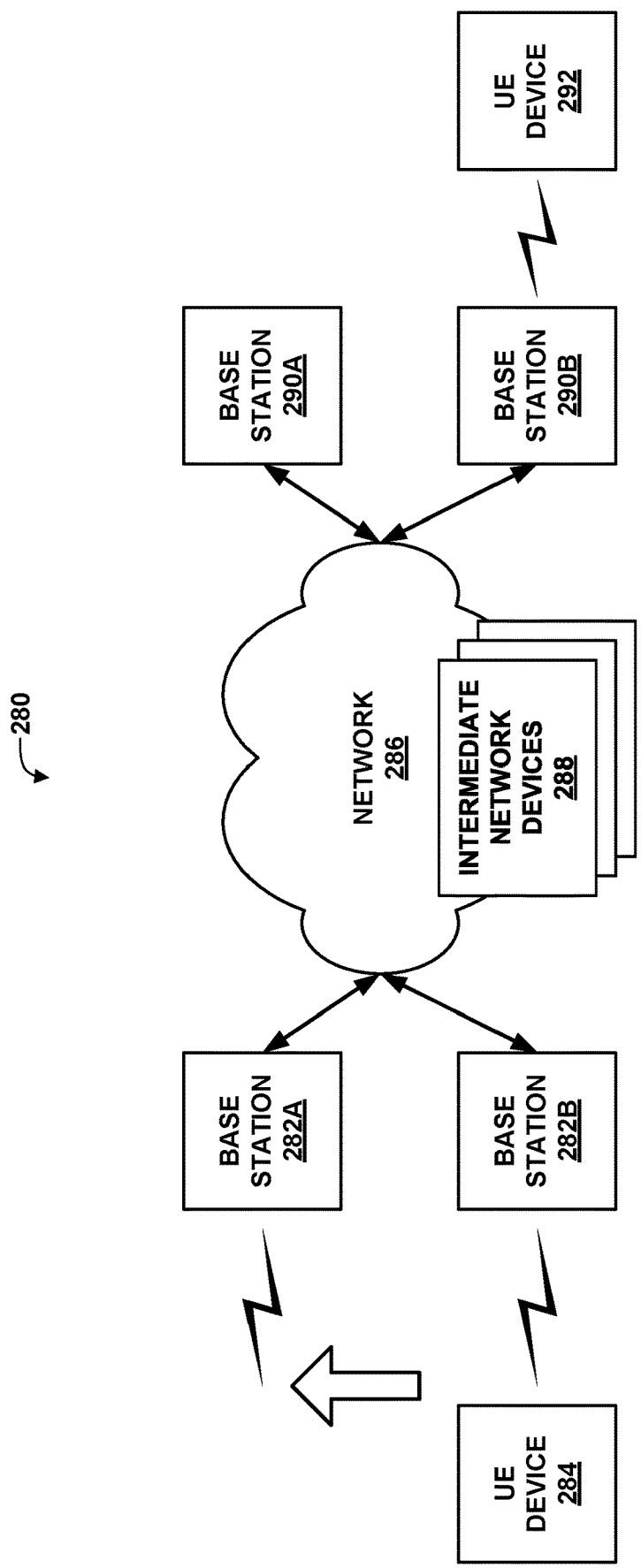
FIG. 9 is a block diagram illustrating an example system including devices that may be configured to perform the techniques of this disclosure.

FIG. 9 is a block diagram illustrating an example system 280 including devices that may be configured to perform the techniques of this disclosure. In particular, system 280 includes user equipment (UE) devices 284, 292, base stations 282A, 282B, 290A, 290B (base stations 282, 290), and network formed by intermediate network devices 288.

Intermediate network devices 288 may generally be any of a variety of different network devices that make up a computer-based network. Intermediate network devices 288 may, for example, include routers, switches, hubs, gateways, service devices, servers, bridges, controllers, or the like. Base stations 282, 290 represent examples of access points for cells of radio access networks (RANs), e.g., 5G RANs. For example, base stations 282, 290 may be respective gNodeBs. UE devices 284, 292 represent respective UE devices, such as cellular phones, tablets, mobile devices or the like.

UE devices 284, 292 may include components for sending and receiving media data, including audio, video, and/or AR/XR/MR/VR data for media or AR teleconferencing. For example, UE devices 284, 292 may include cameras, microphones, and/or graphics processing units (GPUs) for generating AR/XR/MR/VR data.

According to the techniques of this disclosure, UE device 284 and UE device 292 may participate in a media teleconferencing session, such as a video teleconferencing session and/or an AR/XR/MR/VR teleconferencing session. Thus, UE devices 284, 292 may both send and receive media data. When UE device 284 captures or generates media data, UE device 284 may encode and send the captured/generated media data to UE device 292. Likewise, when UE device 292 captures or generates media data, UE device 292 may encode and send the captured/generated media data to UE device 284.

According to the techniques of this disclosure, UE device 284 may move from a cell including base station 282B to a cell including base station 282A. Thus, a handover from base station 282B to base station 282A may occur. In response, UE device 284 may send an autopilot mode indication message to UE device 292, e.g., via a signaling channel. The autopilot mode indication message may signify both that for media data currently being received by UE device 292, UE device 292 should generate replacement media data, and for media data currently being sent by UE device 292, UE device 292 should stop sending media data until the autopilot mode expires. UE device 284 may construct the autopilot mode indication message to indicate a start time and an end time for the autopilot period.

In some examples, one or more of intermediate network devices 288 may be a service device configured to detect such autopilot mode indication messages. The service device of intermediate network devices 288 may, on behalf of UE device 292, generate the replacement media data and encode the replacement media data, such that UE device 292 need not alter its decoding and presentation processes.

In this manner, UE devices 284, 292 represent examples of a device for presenting media data including a memory configured to store media data; and one or more processors implemented in circuitry and configured to: receive a first set of media data of a media bitstream; in response to determining that a second set of media data of the media bitstream following the first set of media data will not be received, predictively generate replacement media data for the second set of media data using the first set of media data; and present the first set of media data and the replacement media data.

Figure 10:
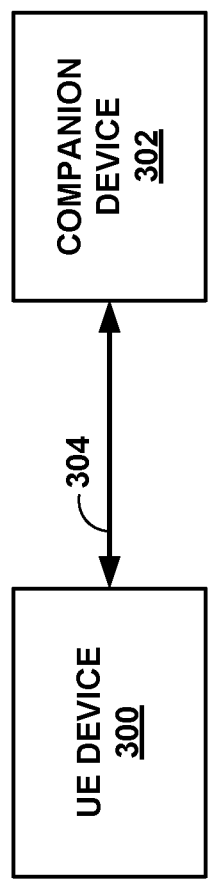
FIG. 10 is a block diagram illustrating an example system including a user equipment (UE) device and a companion device.

FIG. 10 is a block diagram illustrating an example system including a user equipment (UE) device 300 and a companion device 302. UE device 300 and companion device 302 engage in communication session 304. Communication session 304 may be conducted over a wireless communication protocol such as wireless wide area network (WWAN), wireless local area network (WLAN), WiFi, Bluetooth, or the like. UE device 300 may represent any user device, while companion device 302 may represent a close proximity device that is used by the same user in conjunction with UE device 300. For example, UE device 300 may be a cellular telephone while companion device 302 is a wireless display, such as a monitor, television, or AR/XR/MR/VR headset. As another example, UE device 300 may be a tablet or laptop, while companion device 302 may be a cellular telephone, or vice versa.

Although primarily described with respect to the scenario of two UE devices communicating with each other over a network, the techniques of this disclosure may also be performed by UE device 300 and companion device 302. For example, if UE device 300 receives media data, e.g., via a media communication session with another UE device (not shown), UE device 300 may wirelessly present media data of the media communication session via companion device 302. If communication session 304 is briefly interrupted, e.g., because UE device 300 and companion device 302 are physically positioned too far apart from each other, a physical object obstructs the communication session, or for other such reasons, companion device 302 may be configured to detect the interruption and apply the techniques of this disclosure to generate replacement media data until communication session 304 is restored.

In some examples, UE device 300 may determine that a communication session with another UE device (not shown) has been interrupted as in the various examples discussed above, but offload the process of generating replacement media data to companion device 302. For example, companion device 302 may include one or more AI/ML models and AI/ML processes. UE device 300 may send received media data to companion device 302 and a request for replacement media data. In response, companion device 302 may generate the replacement media data through application of the AI/ML models to the received media data and send the replacement media data to UE device 300 via communication session 304.

The following clauses represent certain examples of the techniques of this disclosure:

Clause 1: A method of presenting media data, the method comprising: receiving a first set of media data of a media bitstream; in response to determining that a second set of media data of the media bitstream following the first set of media data will not be received, predictively generating replacement media data for the second set of media data using the first set of media data; and presenting the first set of media data and the replacement media data.

Clause 2: The method of clause 1, wherein receiving the first set of media data comprises receiving the first set of media data via a network, and wherein determining that the second set of media data will not be received comprises determining that a network interruption will prevent reception of the second set of media data.

Clause 3: The method of clause 2, further comprising determining a start time of the network interruption and an end time of the network interruption, wherein predictively generating the replacement data comprises predictively generating the replacement media data for a period of time between the start time of the network interruption and the end time of the network interruption.

Clause 4: The method of clause 1, wherein receiving the first set of media data comprises receiving the first set of media data from a source device via a network, and wherein determining that the second set of media data will not be received comprises receiving data from the source device indicating that the second set of media data will not be received.

Clause 5: The method of clause 4, wherein receiving the data from the source device indicating that the second set of media data will not be received comprises receiving at least one of a supplemental enhancement information (SEI) message or a real-time transport protocol (RTP) message from the source device.

Clause 6: The method of clause 4, wherein receiving the first set of media data comprises receiving the first set of media data from the source device via a media data channel of the network, and wherein receiving the data from the source device indicating that the second set of media data will not be received comprises receiving the data from the source device indicating that the second set of media data will not be received via a signaling channel of the network, the signaling channel being separate from the media data channel.

Clause 7: The method of clause 1, further comprising: presenting a prompt to a user to request user consent to predictively generate replacement media data in the event that media data will not be received; and receiving input data from the user indicating that the user consents to predictively generated replacement media data for the media bitstream.

Clause 8: The method of clause 1, wherein the media data comprises at least one of video data or extended reality (XR) data, the XR data comprising at least one of augmented reality (AR) data, virtual reality (VR) data, or mixed reality (MR) data.

Clause 9: The method of clause 1, further comprising: receiving a third set of media data of the media bitstream; blending at least a portion of the third set of media data with the replacement media data; and presenting the blended at least portion of the third set of media data following the replacement media data.

Clause 10: The method of clause 1, wherein predictively generating replacement media data comprises providing at least a portion of the first set of media data to an artificial intelligence (AI) process or a machine learning (ML) process configured to generate the replacement media data.

Clause 11: A device for presenting media data, the device comprising: a memory configured to store media data; and one or more processors implemented in circuitry and configured to: receive a first set of media data of a media bitstream; in response to determining that a second set of media data of the media bitstream following the first set of media data will not be received, predictively generate replacement media data for the second set of media data using the first set of media data; and present the first set of media data and the replacement media data.

Clause 12: The device of clause 11, wherein the one or more processors are configured to receive the first set of media data via a network, and wherein to determine that the second set of media data will not be received, the one or more network devices are configured to determine that a network interruption will prevent reception of the second set of media data.

Clause 13: The device of clause 12, wherein the one or more processors are further configured to determine a start time of the network interruption and an end time of the network interruption, wherein to predictively generating the replacement data comprises predictively generating the replacement media data for a period of time between the start time of the network interruption and the end time of the network interruption.

Clause 14: The device of clause 11, wherein the one or more processors are configured to receive the first set of media data from a source device via a network, and wherein to determine that the second set of media data will not be received, the one or more processors are configured to receive data from the source device indicating that the second set of media data will not be received.

Clause 15: The device of clause 14, wherein to receive the data from the source device indicating that the second set of media data will not be received, the one or more processors are configured to receive at least one of a supplemental enhancement information (SEI) message or a real-time transport protocol (RTP) message from the source device.

Clause 16: The device of clause 14, wherein the one or more processors are configured to receive the first set of media data from the source device via a media data channel of the network, and wherein the one or more processors are configured to receive the data from the source device indicating that the second set of media data will not be received via a signaling channel of the network, the signaling channel being separate from the media data channel.

Clause 17: The device of clause 11, further comprising a display, wherein the one or more processors are further configured to: present, via the display, a prompt to a user to request user consent to predictively generate replacement media data in the event that media data will not be received; and receive input data from the user indicating that the user consents to predictively generated replacement media data for the media bitstream.

Clause 18: The device of clause 11, wherein the media data comprises at least one of video data or extended reality (XR) data, the XR data comprising at least one of augmented reality (AR) data, virtual reality (VR) data, or mixed reality (MR) data.

Clause 19: The device of clause 11, wherein the one or more processors are further configured to: receive a third set of media data of the media bitstream; blend at least a portion of the third set of media data with the replacement media data; and present the blended at least portion of the third set of media data following the replacement media data.

Clause 20: The device of clause 11, wherein to predictively generate the replacement media data, the one or more processors are configured to provide at least a portion of the first set of media data to an artificial intelligence (AI) process or a machine learning (ML) process configured to generate the replacement media data.

Clause 21: A device for presenting media data, the device comprising: means for receiving a first set of media data of a media bitstream; means for predictively generating replacement media data, in response to determining that a second set of media data of the media bitstream following the first set of media data will not be received, for the second set of media data using the first set of media data; and means for presenting the first set of media data and the replacement media data.

Clause 22: The device of clause 21, wherein the means for receiving the first set of media data comprises means for receiving the first set of media data via a network, further comprising means for determining that a network interruption will prevent reception of the second set of media data.

Clause 23: The device of clause 22, further comprising means for determining a start time of the network interruption and an end time of the network interruption, wherein the means for predictively generating the replacement data comprises means for predictively generating the replacement media data for a period of time between the start time of the network interruption and the end time of the network interruption.

Clause 24: The device of clause 21, wherein the means for receiving the first set of media data comprises means for receiving the first set of media data from a source device via a network, and wherein the means for determining that the second set of media data will not be received comprises means for receiving data from the source device indicating that the second set of media data will not be received.

Clause 25: The device of clause 24, wherein the means for receiving the data from the source device indicating that the second set of media data will not be received comprises means for receiving at least one of a supplemental enhancement information (SEI) message or a real-time transport protocol (RTP) message from the source device.

Clause 26: The device of clause 24, wherein the means for receiving the first set of media data comprises means for receiving the first set of media data from the source device via a media data channel of the network, and wherein the means for receiving the data from the source device indicating that the second set of media data will not be received comprises means for receiving the data from the source device indicating that the second set of media data will not be received via a signaling channel of the network, the signaling channel being separate from the media data channel.

Clause 27: The device of clause 21, further comprising: means for presenting a prompt to a user to request user consent to predictively generate replacement media data in the event that media data will not be received; and means for receiving input data from the user indicating that the user consents to predictively generated replacement media data for the media bitstream.

Clause 28: The device of clause 21, wherein the media data comprises at least one of video data or extended reality (XR) data, the XR data comprising at least one of augmented reality (AR) data, virtual reality (VR) data, or mixed reality (MR) data.

Clause 29: The device of clause 21, further comprising: means for receiving a third set of media data of the media bitstream; means for blending at least a portion of the third set of media data with the replacement media data; and means for presenting the blended at least portion of the third set of media data following the replacement media data.

Clause 30: The device of clause 21, wherein the means for predictively generating the replacement media data comprises means for providing at least a portion of the first set of media data to an artificial intelligence (AI) process or a machine learning (ML) process configured to generate the replacement media data.

Clause 31: A computer-readable storage medium having stored thereon instructions that, when executed, cause a processor to: receive a first set of media data of a media bitstream; in response to determining that a second set of media data of the media bitstream following the first set of media data will not be received, predictively generate replacement media data for the second set of media data using the first set of media data; and present the first set of media data and the replacement media data.

Clause 32: The computer-readable storage medium of clause 31, wherein the instructions that cause the processor to receive the first set of media data comprise instructions that cause the processor to receive the first set of media data via a network, further comprising instructions that cause the processor to determine that a network interruption will prevent reception of the second set of media data.

Clause 33: The computer-readable storage medium of clause 32, further comprising instructions that cause the processor to determine a start time of the network interruption and an end time of the network interruption, wherein the instructions that cause the processor to predictively generate the replacement data comprise instructions that cause the processor to predictively generate the replacement media data for a period of time between the start time of the network interruption and the end time of the network interruption.

Clause 34: The computer-readable storage medium of clause 31, wherein the instructions that cause the processor to receive the first set of media data comprise instructions that cause the processor to receive the first set of media data from a source device via a network, further comprising instructions that cause the processor to receive data from the source device indicating that the second set of media data will not be received.

Clause 35: The computer-readable storage medium of clause 34, wherein the instructions that cause the processor to receive the data from the source device indicating that the second set of media data will not be received comprises instructions that cause the processor to receive at least one of a supplemental enhancement information (SEI) message or a real-time transport protocol (RTP) message from the source device.

Clause 36: The computer-readable storage medium of clause 34, wherein the instructions that cause the processor to receive the first set of media data comprises instructions that cause the processor to receive the first set of media data from the source device via a media data channel of the network, and wherein the instructions that cause the processor to receive the data from the source device indicating that the second set of media data will not be received comprises instructions that cause the processor to receive the data from the source device indicating that the second set of media data will not be received via a signaling channel of the network, the signaling channel being separate from the media data channel.

Clause 37: The computer-readable storage medium of clause 31, further comprising instructions that cause the processor to: present a prompt to a user to request user consent to predictively generate replacement media data in the event that media data will not be received; and receive input data from the user indicating that the user consents to predictively generated replacement media data for the media bitstream.

Clause 38: The computer-readable storage medium of clause 31, wherein the media data comprises at least one of video data or extended reality (XR) data, the XR data comprising at least one of augmented reality (AR) data, virtual reality (VR) data, or mixed reality (MR) data.

Clause 39: The computer-readable storage medium of clause 31, further comprising instructions that cause the processor to: receive a third set of media data of the media bitstream; blend at least a portion of the third set of media data with the replacement media data; and present the blended at least portion of the third set of media data following the replacement media data.

Clause 40: The computer-readable storage medium of clause 31, wherein the instructions that cause the processor to predictively generate replacement media data comprises instructions that cause the processor to provide at least a portion of the first set of media data to an artificial intelligence (AI) process or a machine learning (ML) process configured to generate the replacement media data.

Clause 41: A method of presenting media data, the method comprising: receiving a first set of media data of a media bitstream; in response to determining that a second set of media data of the media bitstream following the first set of media data will not be received, predictively generating replacement media data for the second set of media data using the first set of media data; and presenting the first set of media data and the replacement media data.

Clause 42: The method of clause 41, wherein receiving the first set of media data comprises receiving the first set of media data via a network, and wherein determining that the second set of media data will not be received comprises determining that a network interruption will prevent reception of the second set of media data.

Clause 43: The method of clause 42, further comprising determining a start time of the network interruption and an end time of the network interruption, wherein predictively generating the replacement data comprises predictively generating the replacement media data for a period of time between the start time of the network interruption and the end time of the network interruption.

Clause 44: The method of clause 41, wherein receiving the first set of media data comprises receiving the first set of media data from a source device via a network, and wherein determining that the second set of media data will not be received comprises receiving data from the source device indicating that the second set of media data will not be received.

Clause 45: The method of clause 44, wherein receiving the data from the source device indicating that the second set of media data will not be received comprises receiving at least one of a supplemental enhancement information (SEI) message or a real-time transport protocol (RTP) message from the source device.

Clause 46: The method of any of clauses 44 and 45, wherein receiving the first set of media data comprises receiving the first set of media data from the source device via a media data channel of the network, and wherein receiving the data from the source device indicating that the second set of media data will not be received comprises receiving the data from the source device indicating that the second set of media data will not be received via a signaling channel of the network, the signaling channel being separate from the media data channel.

Clause 47: The method of any of clauses 41-46, further comprising: presenting a prompt to a user to request user consent to predictively generate replacement media data in the event that media data will not be received; and receiving input data from the user indicating that the user consents to predictively generated replacement media data for the media bitstream.

Clause 48: The method of any of clauses 41-47, wherein the media data comprises at least one of video data or extended reality (XR) data, the XR data comprising at least one of augmented reality (AR) data, virtual reality (VR) data, or mixed reality (MR) data.

Clause 49: The method of any of clauses 41-48, further comprising: receiving a third set of media data of the media bitstream; blending at least a portion of the third set of media data with the replacement media data; and presenting the blended at least portion of the third set of media data following the replacement media data.

Clause 50: The method of any of clauses 41-49, wherein predictively generating replacement media data comprises providing at least a portion of the first set of media data to an artificial intelligence (AI) process or a machine learning (ML) process configured to generate the replacement media data.

Clause 51: A device for presenting media data, the device comprising: a memory configured to store media data; and one or more processors implemented in circuitry and configured to: receive a first set of media data of a media bitstream; in response to determining that a second set of media data of the media bitstream following the first set of media data will not be received, predictively generate replacement media data for the second set of media data using the first set of media data; and present the first set of media data and the replacement media data.

Clause 52: The device of clause 51, wherein the one or more processors are configured to receive the first set of media data via a network, and wherein to determine that the second set of media data will not be received, the one or more network devices are configured to determine that a network interruption will prevent reception of the second set of media data.

Clause 53: The device of clause 52, wherein the one or more processors are further configured to determine a start time of the network interruption and an end time of the network interruption, wherein to predictively generating the replacement data comprises predictively generating the replacement media data for a period of time between the start time of the network interruption and the end time of the network interruption.

Clause 54: The device of clause 51, wherein the one or more processors are configured to receive the first set of media data from a source device via a network, and wherein to determine that the second set of media data will not be received, the one or more processors are configured to receive data from the source device indicating that the second set of media data will not be received.

Clause 55: The device of clause 54, wherein to receive the data from the source device indicating that the second set of media data will not be received, the one or more processors are configured to receive at least one of a supplemental enhancement information (SEI) message or a real-time transport protocol (RTP) message from the source device.

Clause 56: The device of any of clauses 54 and 55, wherein the one or more processors are configured to receive the first set of media data from the source device via a media data channel of the network, and wherein the one or more processors are configured to receive the data from the source device indicating that the second set of media data will not be received via a signaling channel of the network, the signaling channel being separate from the media data channel.

Clause 57: The device of any of clauses 51-56, further comprising a display, wherein the one or more processors are further configured to: present, via the display, a prompt to a user to request user consent to predictively generate replacement media data in the event that media data will not be received; and receive input data from the user indicating that the user consents to predictively generated replacement media data for the media bitstream.

Clause 58: The device of any of clauses 51-57, wherein the media data comprises at least one of video data or extended reality (XR) data, the XR data comprising at least one of augmented reality (AR) data, virtual reality (VR) data, or mixed reality (MR) data.

Clause 59: The device of any of clauses 51-58, wherein the one or more processors are further configured to: receive a third set of media data of the media bitstream; blend at least a portion of the third set of media data with the replacement media data; and present the blended at least portion of the third set of media data following the replacement media data.

Clause 60: The device of any of clauses 51-59, wherein to predictively generate the replacement media data, the one or more processors are configured to provide at least a portion of the first set of media data to an artificial intelligence (AI) process or a machine learning (ML) process configured to generate the replacement media data.

Clause 61: A device for presenting media data, the device comprising: means for receiving a first set of media data of a media bitstream; means for predictively generating replacement media data, in response to determining that a second set of media data of the media bitstream following the first set of media data will not be received, for the second set of media data using the first set of media data; and means for presenting the first set of media data and the replacement media data.

Clause 62: The device of clause 61, wherein the means for receiving the first set of media data comprises means for receiving the first set of media data via a network, further comprising means for determining that a network interruption will prevent reception of the second set of media data.

Clause 63: The device of clause 62, further comprising means for determining a start time of the network interruption and an end time of the network interruption, wherein the means for predictively generating the replacement data comprises means for predictively generating the replacement media data for a period of time between the start time of the network interruption and the end time of the network interruption.

Clause 64: The device of clause 61, wherein the means for receiving the first set of media data comprises means for receiving the first set of media data from a source device via a network, and wherein the means for determining that the second set of media data will not be received comprises means for receiving data from the source device indicating that the second set of media data will not be received.

Clause 65: The device of clause 64, wherein the means for receiving the data from the source device indicating that the second set of media data will not be received comprises means for receiving at least one of a supplemental enhancement information (SEI) message or a real-time transport protocol (RTP) message from the source device.

Clause 66: The device of any of clauses 64 and 65, wherein the means for receiving the first set of media data comprises means for receiving the first set of media data from the source device via a media data channel of the network, and wherein the means for receiving the data from the source device indicating that the second set of media data will not be received comprises means for receiving the data from the source device indicating that the second set of media data will not be received via a signaling channel of the network, the signaling channel being separate from the media data channel.

Clause 67: The device of any of clauses 61-66, further comprising: means for presenting a prompt to a user to request user consent to predictively generate replacement media data in the event that media data will not be received; and means for receiving input data from the user indicating that the user consents to predictively generated replacement media data for the media bitstream.

Clause 68: The device of any of clauses 61-67, wherein the media data comprises at least one of video data or extended reality (XR) data, the XR data comprising at least one of augmented reality (AR) data, virtual reality (VR) data, or mixed reality (MR) data.

Clause 69: The device of any of clauses 61-68, further comprising: means for receiving a third set of media data of the media bitstream; means for blending at least a portion of the third set of media data with the replacement media data; and means for presenting the blended at least portion of the third set of media data following the replacement media data.

Clause 70: The device of any of clauses 61-69, wherein the means for predictively generating the replacement media data comprises means for providing at least a portion of the first set of media data to an artificial intelligence (AI) process or a machine learning (ML) process configured to generate the replacement media data.

Clause 71: A computer-readable storage medium having stored thereon instructions that, when executed, cause a processor to: receive a first set of media data of a media bitstream; in response to determining that a second set of media data of the media bitstream following the first set of media data will not be received, predictively generate replacement media data for the second set of media data using the first set of media data; and present the first set of media data and the replacement media data.

Clause 72: The computer-readable storage medium of clause 71, wherein the instructions that cause the processor to receive the first set of media data comprise instructions that cause the processor to receive the first set of media data via a network, further comprising instructions that cause the processor to determine that a network interruption will prevent reception of the second set of media data.

Clause 73: The computer-readable storage medium of clause 72, further comprising instructions that cause the processor to determine a start time of the network interruption and an end time of the network interruption, wherein the instructions that cause the processor to predictively generate the replacement data comprise instructions that cause the processor to predictively generate the replacement media data for a period of time between the start time of the network interruption and the end time of the network interruption.

Clause 74: The computer-readable storage medium of clause 71, wherein the instructions that cause the processor to receive the first set of media data comprise instructions that cause the processor to receive the first set of media data from a source device via a network, further comprising instructions that cause the processor to receive data from the source device indicating that the second set of media data will not be received.

Clause 75: The computer-readable storage medium of clause 74, wherein the instructions that cause the processor to receive the data from the source device indicating that the second set of media data will not be received comprises instructions that cause the processor to receive at least one of a supplemental enhancement information (SEI) message or a real-time transport protocol (RTP) message from the source device.

Clause 76: The computer-readable storage medium of any of clauses 74 and 75, wherein the instructions that cause the processor to receive the first set of media data comprises instructions that cause the processor to receive the first set of media data from the source device via a media data channel of the network, and wherein the instructions that cause the processor to receive the data from the source device indicating that the second set of media data will not be received comprises instructions that cause the processor to receive the data from the source device indicating that the second set of media data will not be received via a signaling channel of the network, the signaling channel being separate from the media data channel.

Clause 77: The computer-readable storage medium of any of clauses 71-76, further comprising instructions that cause the processor to: present a prompt to a user to request user consent to predictively generate replacement media data in the event that media data will not be received; and receive input data from the user indicating that the user consents to predictively generated replacement media data for the media bitstream.

Clause 78: The computer-readable storage medium of any of clauses 71-77, wherein the media data comprises at least one of video data or extended reality (XR) data, the XR data comprising at least one of augmented reality (AR) data, virtual reality (VR) data, or mixed reality (MR) data.

Clause 79: The computer-readable storage medium of any of clauses 71-78, further comprising instructions that cause the processor to: receive a third set of media data of the media bitstream; blend at least a portion of the third set of media data with the replacement media data; and present the blended at least portion of the third set of media data following the replacement media data.

Clause 80: The computer-readable storage medium of any of clauses 71-79, wherein the instructions that cause the processor to predictively generate replacement media data comprises instructions that cause the processor to provide at least a portion of the first set of media data to an artificial intelligence (AI) process or a machine learning (ML) process configured to generate the replacement media data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining that a user consents to use of a mode of operation of a client device in which the client device predictively generates replacement media data;
   receiving, at the client device, a first set of media data of a media bitstream from a device separate from the client device;
   receiving, at the client device and from the device separate from the client device, data explicitly indicating that the client device should enter the mode of operation in which the client device predictively generates replacement media data;
   in response to the receipt of the data explicitly indicating that the client device should enter the mode of operation in which the client device predictively generates replacement media data and the determination that the user consents to use the mode of operation in which the client device predictively generates replacement media data, predictively generating, at the client device, replacement media data for a second set of media data of the media bitstream using at least a subset of the first set of media data; and
   presenting the first set of media data and the replacement media data.

2. The method of claim 1, wherein receiving the first set of media data comprises receiving the first set of media data via a network, the method further comprising determining that the second set of media data will not be received.

3. The method of claim 2, wherein determining that the second set of media data will not be received comprises determining that a network interruption will prevent reception of the second set of media data, the method further comprising determining a start time of the network interruption and an end time of the network interruption, wherein predictively generating the replacement media data comprises predictively generating the replacement media data for a period of time between the start time of the network interruption and the end time of the network interruption.

4. The method of claim 2, wherein receiving the first set of media data comprises receiving the first set of media data from a source device via a network, and wherein determining that the second set of media data will not be received comprises receiving data from the source device indicating that the second set of media data will not be received.

5. The method of claim 4, wherein receiving the data from the source device indicating that the second set of media data will not be received comprises receiving at least one of a supplemental enhancement information (SEI) message or a real-time transport protocol (RTP) message from the source device.

6. The method of claim 4, wherein receiving the first set of media data comprises receiving the first set of media data from the source device via a media data channel of the network, and wherein receiving the data from the source device indicating that the second set of media data will not be received comprises receiving the data from the source device indicating that the second set of media data will not be received via a signaling channel of the network, the signaling channel being separate from the media data channel.

7. The method of claim 1, further comprising:
presenting, to the user, a prompt to request user consent to use of the mode of operation of the client device in which the client device predictively generates replacement media data; and
receiving input data from the user indicating that the user consents to use of the mode of operation of the client device in which the client device predictively generates replacement media data.

8. The method of claim 1, wherein the media data comprises at least one of video data or extended reality (XR) data, the XR data comprising at least one of augmented reality (AR) data, virtual reality (VR) data, or mixed reality (MR) data.

9. The method of claim 1, further comprising:
receiving a third set of media data of the media bitstream;
blending at least a portion of the third set of media data with the replacement media data; and
presenting the blended at least portion of the third set of media data following the replacement media data.

10. The method of claim 1, wherein predictively generating replacement media data comprises providing at least a portion of the first set of media data to an artificial intelligence (AI) process or a machine learning (ML) process configured to generate the replacement media data.

11. A device comprising:
a memory configured to store media data; and
one or more processors implemented in circuitry and configured to:
determine that a user consents to use of a mode of operation of the device in which the device predictively generates replacement media data;
receive, at the device, a first set of media data of a media bitstream from a network device separate from the device;
receive, at the device and from the network device separate from the device, data explicitly indicating that the device should enter the mode of operation in which the device predictively generates replacement media data;
in response to the receipt of the data explicitly indicating that the device should enter the mode of operation in which the device predictively generates replacement media data and the determination that the user consents to use the mode of operation in which the device predictively generates replacement media data, predictively generate, at the device, replacement media data for a second set of media data of the media bitstream using at least a subset of the first set of media data; and
present the first set of media data and the replacement media data.

12. The device of claim 11, wherein the one or more processors are further configured to:
receive the first set of media data via a network; and
determine that the second set of media data will not be received.

13. The device of claim 12, wherein the one or more processors are further configured to:
determine a start time of a network interruption that will prevent the second set of media data from being received and an end time of the network interruption; and
predictively generate the replacement media data for a period of time between the start time of the network interruption and the end time of the network interruption.

14. The device of claim 12, wherein the one or more processors are configured to receive the first set of media data from a source device via a network, and wherein to determine that the second set of media data will not be received, the one or more processors are configured to receive data from the source device indicating that the second set of media data will not be received.

15. The device of claim 14, wherein to receive the data from the source device indicating that the second set of media data will not be received, the one or more processors are configured to receive at least one of a supplemental enhancement information (SEI) message or a real-time transport protocol (RTP) message from the source device.

16. The device of claim 14, wherein the one or more processors are configured to receive the first set of media data from the source device via a media data channel of the network, and wherein the one or more processors are configured to receive the data from the source device indicating that the second set of media data will not be received via a signaling channel of the network, the signaling channel being separate from the media data channel.

17. The device of claim 11, further comprising a display, wherein the one or more processors are further configured to:
present, via the display, a prompt to a user to request user consent to use of the mode of operation of the device in which the device predictively generates replacement media data; and
receive input data from the user indicating that the user consents to use of the mode of operation of the device in which the device predictively generates replacement media data.

18. The device of claim 11, wherein the media data comprises at least one of video data or extended reality (XR) data, the XR data comprising at least one of augmented reality (AR) data, virtual reality (VR) data, or mixed reality (MR) data.

19. The device of claim 11, wherein the one or more processors are further configured to:
receive a third set of media data of the media bitstream;
blend at least a portion of the third set of media data with the replacement media data; and
present the blended at least portion of the third set of media data following the replacement media data.

20. The device of claim 11, wherein to predictively generate the replacement media data, the one or more processors are configured to provide at least a portion of the first set of media data to an artificial intelligence (AI) process or a machine learning (ML) process configured to generate the replacement media data.

21. A device for presenting media data, the device comprising:
means for determining that a user consents to use of a mode of operation of a device in which the device predictively generates replacement media data;
means for receiving a first set of media data of a media bitstream from a network device separate from the device;
means for receiving, at the device and from the network device separate from the device, data explicitly indicating that the device should enter the mode of operation in which the device predictively generates replacement media data;
means for predictively generating replacement media data for a second set of media data of the media bitstream using at least a subset of the first set of media data, in response to the receipt of the data explicitly indicating that the device should enter the mode of operation in which the device predictively generates replacement media data and the determination that the user consents to use the mode of operation in which the device predictively generates replacement media data; and
means for presenting the first set of media data and the replacement media data.

22. The device of claim 21, wherein the means for receiving the first set of media data comprises means for receiving the first set of media data via a network, further comprising means for determining that the second set of media data will not be received.

23. The device of claim 22, wherein the means for determining that the second set of media data will not be received comprises means for determining that a network interruption will prevent reception of the second set of media data, the device further comprising means for determining a start time of the network interruption and an end time of the network interruption, wherein the means for predictively generating the replacement media data comprises means for predictively generating the replacement media data for a period of time between the start time of the network interruption and the end time of the network interruption.

24. The device of claim 22, wherein the means for receiving the first set of media data comprises means for receiving the first set of media data from a source device via a network, and wherein the means for determining that the second set of media data will not be received comprises means for receiving data from the source device indicating that the second set of media data will not be received.

25. The device of claim 24, wherein the means for receiving the data from the source device indicating that the second set of media data will not be received comprises means for receiving at least one of a supplemental enhancement information (SEI) message or a real-time transport protocol (RTP) message from the source device.

26. The device of claim 24, wherein the means for receiving the first set of media data comprises means for receiving the first set of media data from the source device via a media data channel of the network, and wherein the means for receiving the data from the source device indicating that the second set of media data will not be received comprises means for receiving the data from the source device indicating that the second set of media data will not be received via a signaling channel of the network, the signaling channel being separate from the media data channel.

27. The device of claim 21, further comprising:
means for presenting a prompt to a user to request user consent to use of the mode of operation of the device in which the device predictively generates replacement media data; and
means for receiving input data from the user indicating that the user consents to use of the mode of operation of the device in which the device predictively generates replacement media data.

28. The device of claim 21, wherein the media data comprises at least one of video data or extended reality (XR) data, the XR data comprising at least one of augmented reality (AR) data, virtual reality (VR) data, or mixed reality (MR) data.

29. The device of claim 21, further comprising:
means for receiving a third set of media data of the media bitstream;
means for blending at least a portion of the third set of media data with the replacement media data; and
means for presenting the blended at least portion of the third set of media data following the replacement media data.

30. The device of claim 21, wherein the means for predictively generating the replacement media data comprises means for providing at least a portion of the first set of media data to an artificial intelligence (AI) process or a machine learning (ML) process configured to generate the replacement media data.

31. A computer-readable storage medium having stored thereon instructions that, when executed, cause a processor of a client device to:
determine that a user consents to use of a mode of operation of the client device in which the client device predictively generates replacement media data;
receive a first set of media data of a media bitstream from a device separate from the client device;
receive, from the device separate from the client device, data explicitly indicating that the client device should enter the mode of operation in which the client device predictively generates replacement media data;
in response to the receipt of the data explicitly indicating that the client device should enter the mode of operation in which the client device predictively generates replacement media data and the determination that the user consents to use the mode of operation in which the device predictively generates replacement media data, predictively generate replacement media data for a second set of media data of the media bitstream using at least a subset of the first set of media data; and
present the first set of media data and the replacement media data.

32. The computer-readable storage medium of claim 31, wherein the instructions that cause the processor to receive the first set of media data comprise instructions that cause the processor to receive the first set of media data via a network, the computer-readable storage medium further comprising instructions that cause the processor to determine that the second set of media data will not be received.

33. The computer-readable storage medium of claim 32, further comprising instructions that cause the processor to:
    determine a start time of a network interruption and an end time of the network interruption; and
    predictively generate the replacement media data for a period of time between the start time of the network interruption and the end time of the network interruption.

34. The computer-readable storage medium of claim 32, wherein the instructions that cause the processor to receive the first set of media data comprise instructions that cause the processor to receive the first set of media data from a source device via a network, further comprising instructions that cause the processor to receive data from the source device indicating that the second set of media data will not be received.

35. The computer-readable storage medium of claim 34, wherein the instructions that cause the processor to receive the data from the source device indicating that the second set of media data will not be received comprises instructions that cause the processor to receive at least one of a supplemental enhancement information (SEI) message or a real-time transport protocol (RTP) message from the source device.

36. The computer-readable storage medium of claim 34, wherein the instructions that cause the processor to receive the first set of media data comprises instructions that cause the processor to receive the first set of media data from the source device via a media data channel of the network, and wherein the instructions that cause the processor to receive the data from the source device indicating that the second set of media data will not be received comprises instructions that cause the processor to receive the data from the source device indicating that the second set of media data will not be received via a signaling channel of the network, the signaling channel being separate from the media data channel.

37. The computer-readable storage medium of claim 31, further comprising instructions that cause the processor to:
    present a prompt to a user to request user consent to use of the mode of operation of the client device in which the client device predictively generates replacement media data; and
    receive input data from the user indicating that the user consents to use of the mode of operation of the client device in which the client device predictively generates replacement media data.

38. The computer-readable storage medium of claim 31, wherein the media data comprises at least one of video data or extended reality (XR) data, the XR data comprising at least one of augmented reality (AR) data, virtual reality (VR) data, or mixed reality (MR) data.

39. The computer-readable storage medium of claim 31, further comprising instructions that cause the processor to:
    receive a third set of media data of the media bitstream;
    blend at least a portion of the third set of media data with the replacement media data; and
    present the blended at least portion of the third set of media data following the replacement media data.

40. The computer-readable storage medium of claim 31, wherein the instructions that cause the processor to predictively generate replacement media data comprises instructions that cause the processor to provide at least a portion of the first set of media data to an artificial intelligence (AI) process or a machine learning (ML) process configured to generate the replacement media data.

* * * * *